United States Patent [19]

DePalma et al.

[11] Patent Number: 5,759,713
[45] Date of Patent: Jun. 2, 1998

[54] UPWARD DEFLECTING SUPPORT DISK FOR ELECTROCHEMICAL CELL SEAL

[75] Inventors: Christopher L. DePalma, Framingham, Mass.; Peter Pope, Balcombe, England; Sean A. Sargeant, Westford; Marian Wiacek, Holliston, both of Mass.; Robert A. Yoppolo, Woonsocket, R.I.

[73] Assignee: Duracell, Inc., Bethel, Conn.

[21] Appl. No.: 616,062

[22] Filed: Mar. 14, 1996

Related U.S. Application Data

[63] Continuation of Ser. No. 295,116, Aug. 24, 1994, abandoned.

[51] Int. Cl.$^6$ ................................................ H01M 2/00
[52] U.S. Cl. .......................... 429/54; 429/172; 429/174
[58] Field of Search .............................. 429/53, 54, 56, 429/171–174, 178, 181, 185

[56] References Cited

U.S. PATENT DOCUMENTS

| | | | |
|---|---|---|---|
| 3,218,197 | 11/1965 | Carmichael et al. | 136/133 |
| 3,219,488 | 11/1965 | Southworth | 136/133 |
| 3,823,039 | 7/1974 | Sanchez | 429/170 |
| 4,075,398 | 2/1978 | Levy | 429/56 |
| 4,122,241 | 10/1978 | Ciliberti, Jr. et al. | 429/172 X |
| 4,191,806 | 3/1980 | Levy | 429/56 |
| 4,237,203 | 12/1980 | Tsuchida et al. | 429/56 X |
| 4,447,507 | 5/1984 | Larramaga | 429/54 |
| 4,476,200 | 10/1984 | Markin et al. | 429/56 |
| 4,537,841 | 8/1985 | Wiacek et al. | 429/56 |
| 4,774,155 | 9/1988 | Nieutiedt et al. | 429/56 |
| 5,080,985 | 1/1992 | Wiacek et al. | 429/172 |
| 5,150,602 | 9/1992 | Payne et al. | 29/623.2 |
| 5,227,261 | 7/1993 | Georgopoulus | 429/56 |

*Primary Examiner*—Anthony Skapars
*Attorney, Agent, or Firm*—Barry D. Josephs; Paul I. Douglas

[57] ABSTRACT

A metal support disk useful in sealing an electrochemical cell exerts a resilient outward radial force against the seal to assure seal integrity over a wide temperature range and exerts an upward force against an adjacent metal end cap terminal to assure continued mechanical and electrical contact with the terminal. The support is a stepped disk having a centrally located, shallow, cylindrical pill-box, with the bottom of the pill-box extending radially outward into an annular ring. A spring means in the form of an S-shaped rim extends down from the periphery of the ring, terminating at its bottom in an outward extending flange. The edge of the flange presses a plastic seal member against the inside wall of the cell to form the seal.

2 Claims, 2 Drawing Sheets

UPWARD DEFLECTING SUPPORT DISK FOR ELECTROCHEMICAL CELL SEAL

This application is a continuation of application Ser. No. 08/295116, filed Aug. 24, 1994, now abandoned.

BACKGROUND OF THE INVENTION

1. Field of the Invention

This invention relates to an upward deflecting metal support disk useful in a seal for an electrochemical cell. More particularly, this invention relates to an electrochemical cell, such as a primary alkaline cell, sealed at one end with a seal containing a support disk which exhibits a resilient outward radial force against the seal and deflects slightly upward when radially compressed during the sealing process, to assure seal integrity and a positive electrical contact with the metal end cap terminal of the cell.

2. Background of the Disclosure

Electrochemical cells, such as alkaline primary cells, are made by filling a metal can open at one end and closed at the other end, with the electrochemically active ingredients, inserting a seal assembly in the open end and then crimping to seal the cell. The seal assembly includes a disk of plastic or metal as a support against which the seal is made to prevent leakage of the cell's internal chemical components. Therefore, the support disk must be strong enough to make a seal without being crushed during the sealing step of the manufacturing process. Seals employing a rigid metal disk do not contract and expand through temperature variations in a manner which maintains an even pressure on the seal. This is due to the differences in the thermal expansion and contraction characteristics of the metal can, the different materials employed in the seal, including the metal support disk, manufacturing tolerance variables which can not be avoided, and also creep of the plastic seal member. As a result, such cells are prone to leakage. Similarly, if the support is thick plastic, the large seal area results in a lower pressure exerted on the seal. An example of such a fairly rigid type of plastic support is disclosed, for example, in U.S. Pat. No. 5,227,261. More recently, there have been efforts to develop a more resilient seal for an electrochemical cell. These efforts have resulted in the development of a seal assembly which includes an electrically nonconductive, plastic seal member, a metal support disk, a current collector and a metal end cover or cap which serves as one terminal of the cell. The metal support disk permits the cell to be sealed by a crimping step which exerts a radially inward force to the seal assembly and which radially compresses the support to a small extent. The member which achieves the actual seal is generally disk or wheel-shaped and is fabricated as a single piece of injection molded plastic, although some assemblies have employed two or more plastic members to achieve the seal. Illustrative, but non-limiting examples of seal assemblies employing a plastic seal member, metal support disk, current collector and metal end cap terminal and their use with electrochemical cells are disclosed, for example, in U.S. Pat. Nos. 4,537,841 and 5,080,985. However, there is still a need for a seal having a support disk which will maintain a fairly uniform and constant pressure on the seal over the anticipated temperature range through which the cell may be in service, in order to maintain seal integrity and at the same time insure that electrical contact with the end cap terminal is maintained.

SUMMARY OF THE INVENTION

The present invention relates to a support disk useful in sealing an electrochemical cell, such as a primary alkaline cell, wherein the disk exerts a resilient outward radial force against the seal and deflects slightly upward when radially compressed during the sealing process to assure both seal integrity and a positive electrical contact with the metal end cap terminal of the cell. The support disk of the invention is designed so that when it is compressed radially inward during the crimping operation which forms the seal, it is not crushed, but is compressed, preferably within its elastic limits, so that after crimping it will continue to exert a radial outward force against the seal. The support is a stepped disk having a raised central portion in the shape of a pill-box having an upper surface terminating at its periphery in a downward extending wall, with said wall extending radially outward at its bottom into an annular ring, with a resilient spring means in the form of an S-shaped rim depending downward from the outer periphery of said ring, and with the bottom of said rim peripherally terminating radially outward in a flange. The flange has a free edge at its outer periphery for making a seal against a plastic seal member, a portion of which is disposed between the edge of the flange and the interior wall surface of the metal cell container. The support is used in a seal assembly which includes a plastic seal member, the support of the invention, an anode current collector and a metal end cap which forms the negative terminal of the cell. Thus, the invention relates to an electrochemical cell seal assembly employing the support disk of the invention and also to an electrochemical cell containing the support disk. During the sealing process, a radial compressive force is circumferentially applied to the outside of the metal cell container which compresses the container radially inward against the free edge of the flange with the seal member disposed between the container and the edge of the flange. This causes the edge of the flange to bite into and compress the seal member to form the seal. It also causes the S-shaped rim of the support to elastically bend radially inward in somewhat cantilever fashion, away from the applied compressive force and also urges the pill-box portion slightly upward against the adjacent metal end cap terminal. Thus, the rim is a resilient spring means which deflects or bends radially inward during the sealing process, so that after the cell is sealed, the outer edge of the flange continues to exert a circumferentially radially outward force against the cell seal member to insure seal integrity throughout the life of the cell and, at the same time, an upward force against the metal end cap terminal is also maintained to assure an electrical contact between the support or current collector and the terminal during the life of the cell over the desired operating temperature range for the cell which, for an alkaline primary cell, will generally be in the range of from about −30° to +80° C.

DETAILED DESCRIPTION

Figure 1A:
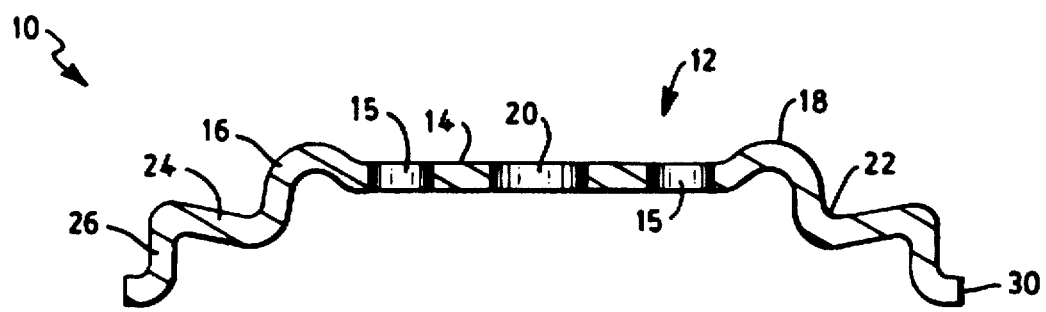
FIGS. 1(a) and 1(b) illustrate a schematic cross-sectional view and a partial perspective view, respectively, of a support disk of the invention.
Figure 1B:
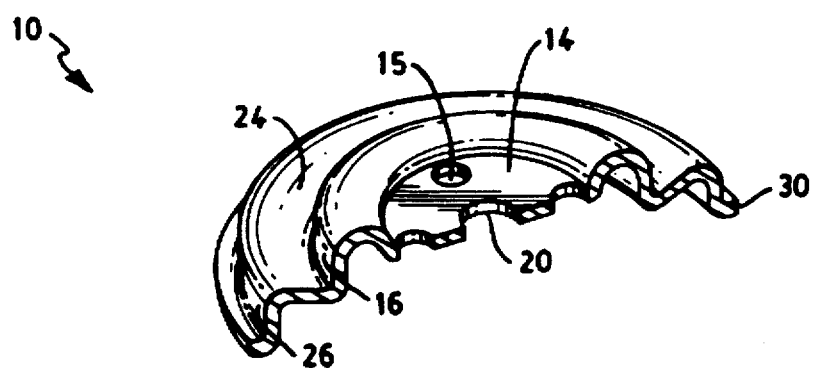
Figure 2:
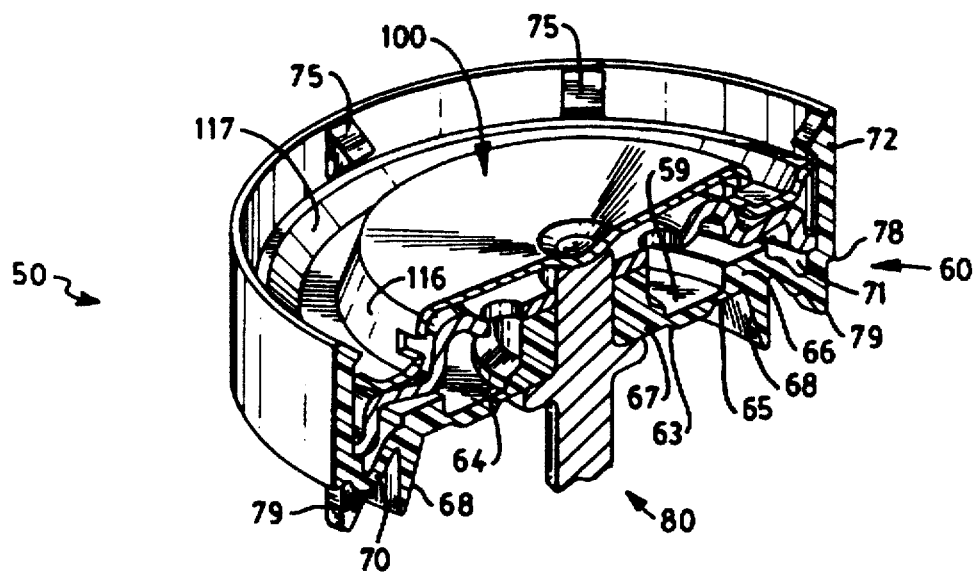
FIG. 2 is a cut-away view, in perspective, of a seal assembly for an electrochemical cell which employs a support disk of the invention.
Figure 3:
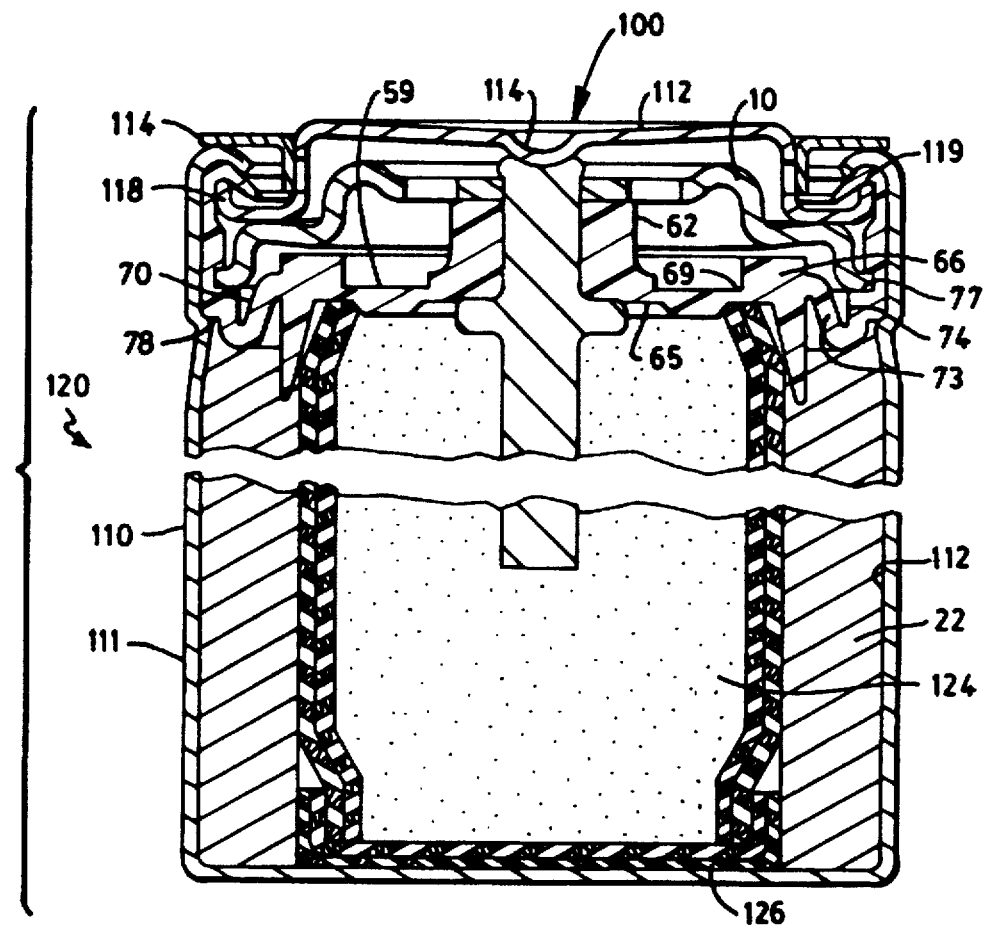
FIG. 3 schematically illustrates a cross section of an alkaline primary cell having a seal which employs a support disk of the invention.

Referring to FIGS. 1(a) and 1(b), a support disk 10 of the invention is shown as being a stepped disk of a unitary construction and comprising a raised central portion 12 shaped like a pill-box in that central portion 12 is a shallow cylinder having an upper, planar surface 14 and cylindrical side wall 16. Surface 14 contains a hole 20 in its center for accommodating a current collector as shown in FIGS. 2 and 3 and, in this embodiment, is depressed slightly below the top 18 of wall 16 to accommodate protrusion of one end of a current collector without having to increase the space over the support when used in a cell as shown in the Figures. The bottom 22 of pill-box 12 extends radially outward at a slight upward angle into annular ring 24. Annular ring 24 does not depend horizontally outward from the bottom of the pill-box, but is angled slightly upward from the bottom 22 of cylindrical wall 16. In an embodiment such as that illustrated in the Figures, this upward angle is about 5 degrees. S-shaped rim 26 depends downward from the periphery of ring 24 and terminates radially outward in flange 28 having an outer edge 30. A plurality of holes 15 aid in venting the cell. A radially inward force circumferentially applied to the edge 30 of support 10 urges the top portion upward instead of downward as is the case with the support disclosed in U.S. Pat. No. 5,080,985. As set forth above, a radial compressive force circumferentially applied to the outer periphery 30 of flange 28 during the sealing process compresses the flange radially inward. This causes rim 26 to bend radially inward at its lower portion which tends to tilt ring 24, and concomitantly wall 16, upward, all of which results in an upward force being applied to the central portion 12. Crimp sealing processes which exert a radially inward compressive force are known to those skilled in the art and are disclosed, for example, in U.S. Pat. Nos. 5,080,985 and 5,150,602. It is preferred that the support member undergo elastic and not plastic deformation during the sealing process in order to maintain the maximum radially outward resilient force against the actual seal that is possible with the material from which the seal is fabricated.

The upward urging of the top of the support helps to insure that physical contact and concomitant electrical contact of the upper portion of current collector 80 with the metal end cap terminal 100 shown in FIGS. 2 and 3 will be maintained during the lifetime of the cell. In an alternative embodiment, the upper portion or top 18 of the support disk can make the physical and electrical contact with the metal end cap terminal 100 instead of the upper portion of the current collector as is disclosed, for example, in the '985 and '602 patents. Disk 10 can be made of any suitable resilient material and particularly a metal such as cold rolled steel, stainless steel and the like, with the choice of material being left to the discretion of the practitioner and the particular design of the cell in which it is to be used. For example, in a cell design in which the electrically conductive current collector which makes physical and electrical contact with the metal end cap terminal, it will be possible to use an electrically nonconductive support. On the other hand, when the support itself must make the mechanical and concomitant electrical contact with the metal end cap, then the support must be made of metal or other suitable electrically conductive material as will be appreciated by those skilled in the art. In an embodiment such as that described herein, the support disk of the invention is stamped from fifteen mil cold rolled steel.

FIG. 2 is a cut-away view, in perspective, of a cell seal assembly employing a support of the invention, which in this embodiment is for a size AA alkaline primary cell. FIG. 3 schematically illustrates a cross section of a size AA alkaline primary cell, one end of which is sealed with the said seal assembly by crimping. FIG. 2 illustrates a preferred embodiment in which the seal assembly 50, including the support 10 of the invention, is preassembled as an integrated part which can be handled as a single element during cell assembly. Referring to FIGS. 2 and 3, seal assembly 50 is shown as including a metal support member 10 of the invention, a molded plastic seal member 60, a metal current collector 80 and a metal cap 100. In this embodiment, cap 100 is the negative terminal of the alkaline primary cell. Metal current collectors are commonly referred to by those skilled in the art as nails and such types of current collectors may be used in the practice of the invention if desired. In the embodiment illustrated and described herein, the metal current collector is more like a rivet than a nail. Plastic seal member 60 is shown as generally disk or wheel-shaped having a unitary construction with a centrally located cylindrical hub 62 from which circumferentially depend, in outward radial sequence, an annular vent 64, followed by an annular boss 66, a downwardly projecting skirt 68, annular flexure or spring means 70 which permits the rim to move radially inward and outward, and finally terminating in a rim having an upwardly extending cylindrical wall portion 72 at the outer periphery. Hub 62 has an axial bore as shown, through which projects the upper portion of current collector 80 which in this embodiment is peened or riveted at its top to secure support 10 to the plastic seal member. In the embodiment shown, annular vent 64 is generally planar and comprises a thin membrane 63 as a ring depending from and attached to hub 62 and diaphragm 59; a thicker, annular diaphragm 59, and a hinge member 65 as a ring around the outer edge of the diaphragm by which it is attached to annular boss 66. Boss 66 is illustrated as a relatively thick ring. It functions to prevent ballooning of the seal member under cell pressure by its upper surface contacting the bottom of annular ring 24 of the support disk. Skirt 68 depends from the outer portion of boss 66 and extends down to prevent mixing of the anode and cathode components of the cell as is illustrated in FIG. 3. Flexure means 70 of seal member 60 circumferentially depends radially outward from the skirt 68 and includes annular V-shaped channel 71 formed by walls 73 and 74. Finally, upwardly extending rim 72 depends from the upper portion of wall 74 and contains a plurality of lugs 75 extending radially inward on the interior surface of its upper portion 76 for positively securing end cap 100 within so that the seal assembly can be handled as a single integrated unit during assembly of the cell. A circumferential shoulder on the interior surface of rim 72 supports the edge of metal support 10 during crimping. Illustrative, but non-limiting examples of materials suitable for use in fabricating the plastic seal member 60 include nylon, nylon alloys, polysulfone and filled polypropylene, as is known to those skilled in the art and is disclosed, for example, in the '595 patent, the disclosure of which is incorporated herein by reference.

During assembly, cap 100 is placed on top of the lugs and pressed or snapped past the lugs and down into the cavity defined by the cylindrical wall of rim 72. A plurality of ribs 79 are shown extending radially outward of the exterior surface on the upper portion of wall 74 and downward from the bottom, exterior shoulder 78 of rim 72. These ribs permit the seal assembly to be inserted into the top of the cylindrical metal container which serves as the positive cell terminal, while at the same time permitting entrained air to escape as the seal assembly is placed in the can to avoid "pumping" of the electrolyte out of the can during assembly. These ribs are dimensioned so as to achieve a slight interference fit with the corresponding internal cell wall 112 as illustrated in FIG. 3, so that the seal assembly is held in position in the cell container during assembly and crimping operations. While this particular design of a seal means is a preferred embodiment, those skilled in the art will appreciate that other designs may be employed for the seal means, illustrative, but non-limiting examples of which include those types described in the '985 and '602 patents.

When the seal is formed by crimping, radial edge 30 of support 10 bites into the interior portion of rim or wall 72 of the seal member 60 as shown in FIGS. 2 and 3. It is preferred that the edge 30 of the support compress the rim wall 72 of the seal member 60 in an amount of at least 25% of the wall thickness in order to achieve a good seal. As stated above, the metal support 10 is designed as illustrated so that the edge exhibits a spring-like resiliency and exerts a radially outward compressive force on the seal member wall which is maintained over the life of the cell to assure that the seal is maintained over a wide temperature range (e.g., about −30° to +80° C). Also, it will be appreciated that flexure means 70 permits the rim of the seal member to move radially inward and outward during assembly and crimping operations, and also during temperature fluctuations, without affecting the rest of the base of the seal, including the pressure vent.

Shoulder 78 on the bottom of rim 72 is shown in FIG. 3 as supporting the seal assembly in the cell 120 by resting on an interior circumferential shoulder crimped into the metal can 110 which forms the container of the cell and is also the positive terminal. Metal end cap 100 which is the negative terminal of cell 120 is illustrated in this embodiment as a metal disk having a planar central disk portion 112 which slopes slightly downward towards its center at which is centrally located a downwardly protruding dimple 114. A relatively shallow cylindrical portion 116 depends downward from the outer periphery of 112, with a flange 117 depending from the bottom of 116, extending radially outward and terminating at its outer periphery in an upward extending rim 118 having a circumferential outer edge 119. As with the seal means described above, this particular end cap construction is a preferred embodiment which is not intended to be limiting with respect to the practice of the invention. Thus other end cap designs may be employed such as that illustrated in the '985 patent.

Seal assembly 50 is shown as crimp sealed into the upper end of cell 120 by a permanent bend 130 circumferentially formed in the upper end of the metal cell wall. The crimp forces the cell wall against the outer surface of rim 72 of plastic seal member 60 and bends them both together down and over the edge 119 Of metal cap 100 to seal the cell. At the same time an inward radial force is circumferentially applied to the outer edge 30 of support 10 during the crimping operation which results in a permanent upward deflection and force applied to the central platform 12 of the support, helping to insure physical and electrical contact between the upper end of the current collector and the dimple in the end cap 100. Metal anode current collector or rivet 80 is shown with the top of its upper portion peened or riveted over onto metal support 10 which secures it firmly in place against the top of hub 62. Upward movement of the current collector is prevented by flange 122. The planar upper portion of the end cap is shown in FIG. 3 as being dished downwards towards the center for the sake of illustrating the construction of the cap prior to crimping.

However, during the crimping and sealing operation, a radial inward force is applied to the side of the seal assembly which, in this preferred embodiment, results in the assembly being permanently compressed inward. This in turn causes the upper portion of the support to be deflected slightly upward, with the upper end of the current collector permanently pushing the dimple up so that the upper planar portion of end cap terminal is permanently flat. This also results in a permanent upward force by the upper end of the current collector on the dimple which assures a permanent mechanical and concomitant electrical connection between the metal current collector and end cap during the life of the cell.

Cell 120 in FIG. 3 is meant to be representative of a typical AA size alkaline cell having a gelled zinc anode and a $MnO_2$ cathode. As is known to those skilled in the art, inside cell 120, an $MnO_2$ cathodic material 122 is in contact with the interior surface of metal can 110 and is separated from a gelled zinc anode material 124 by means of electrically nonconductive membrane 126 which also prevents the anodic material from contacting the bottom of the can. Skirt 68 of plastic seal member 60 overlaps the separator and prevents the anodic and cathodic materials from mixing in the cell. Current collector 80 extends into the anodic material as shown in FIG. 3 and thereby makes an electrical connection between the gelled zinc anode and the metal end cap terminal.

It is understood that various other embodiments and modifications in the practice of the invention will be apparent to, and can readily made by, those skilled in the art without departing from the scope and spirit of the invention disclosed above. Accordingly, it is not intended that the scope of the claims appended hereto be limited to the description set forth above, but rather that the claims be construed as encompassing all of the features of patentable novelty which reside in the present invention, including all features and embodiments which would be treated as equivalents thereof by those skilled in the art to which the invention pertains.

What is claimed is:

1. A support disk useful in sealing an alkaline electrochemical cell with a central axial current collector, said support disk comprising a depressed cylindrical central portion with a hole therethrough for accommodating said current collector, said depressed central portion having an upper surface which terminates at its periphery in a first downward extending cylindrical wall, said first wall extending radially outward and curved at an upward angle at its bottom to form an annular ring terminating at its periphery in a second downward extending cylindrical wall, and with a flange extending radially outward from the bottom of said second wall, whereby said flange exerts a radially outward force and said central portion and said central axial current collector are urged upward when a radially inward compressive force is circumferentially applied to the periphery of said flange.

2. The support disk of claim 1 wherein said first wall is curved at its bottom at an upward angle of about 5 degrees from horizontal as measured when said disk is oriented in horizontal position.

* * * * *